US011035733B2

(12) United States Patent
Tamal et al.

(10) Patent No.: US 11,035,733 B2
(45) Date of Patent: Jun. 15, 2021

(54) METHOD FOR CHROMATIC CALIBRATION OF AN EMBEDDED CAMERA OF A MOBILE WIRELESS DEVICE

(71) Applicant: Imam Abdulrahman Bin Faisal University, Dammam (SA)

(72) Inventors: Mahbubunnabi Tamal, Dammam (SA); Maram Abdullah Alqarni, Dammam (SA); Danah Naif Alotaibi, Dammam (SA); Meernah Mohammed Alabdullah, Dammam (SA); Mona Ameen Alhawaj, Dammam (SA); Fatimah Najib Alsafwani, Dammam (SA); Noor Sami Alhawaj, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 16/145,813

(22) Filed: Sep. 28, 2018

(65) Prior Publication Data
US 2020/0103283 A1    Apr. 2, 2020

(51) Int. Cl.
| | | |
|---|---|---|
| *G06K 9/00* | (2006.01) | |
| *G01J 3/52* | (2006.01) | |
| *G06T 7/90* | (2017.01) | |
| *G03B 15/05* | (2021.01) | |
| *G01J 3/02* | (2006.01) | |
| *G01J 3/50* | (2006.01) | |
| *G01J 3/46* | (2006.01) | |

(52) U.S. Cl.
CPC .............. *G01J 3/524* (2013.01); *G01J 3/0262* (2013.01); *G01J 3/0272* (2013.01); *G01J 3/463* (2013.01); *G01J 3/501* (2013.01); *G03B 15/05* (2013.01); *G06T 7/90* (2017.01); *G03B 2215/0567* (2013.01)

(58) Field of Classification Search
CPC ........ G01J 3/524; G01J 3/0262; G01J 3/0272; G01J 3/463; G01J 3/501; G06T 7/90; G03B 15/05; G03B 2215/0567
See application file for complete search history.

(56) References Cited

U.S. PATENT DOCUMENTS

| | | | | |
|---|---|---|---|---|
| 6,061,591 | A * | 5/2000 | Freitag ................. | A61B 5/0071 600/476 |
| 7,639,401 | B2 * | 12/2009 | Bala ..................... | H04N 9/3194 358/3.24 |
| 9,066,072 | B2 | 6/2015 | Bai et al. | |

(Continued)

FOREIGN PATENT DOCUMENTS

GB    2546329 A *    7/2017    ............. H04N 9/735

OTHER PUBLICATIONS

Fast calibration of—cameras, Pierre Lebraly et al., IEEE, 978-1-61284-385-8, 2011, pp. 223-227 (Year: 2011).*

(Continued)

*Primary Examiner* — Jayesh A Patel

(57) ABSTRACT

Chromatic calibration of a device having an embedded camera proceeds by illuminating a plurality of color references with at least one light source. Images of the respective illuminated color references are captured with the embedded camera. Color calibration data from are determined from the captured images and the color calibration data are stored in association with an identifier of the device.

5 Claims, 6 Drawing Sheets

(56) References Cited

U.S. PATENT DOCUMENTS

| | | | |
|---|---|---|---|
| 9,076,068 B2* | 7/2015 | Agarwal | G01J 3/462 |
| 9,311,520 B2* | 4/2016 | Burg | G06T 7/60 |
| 9,342,872 B2 | 5/2016 | Horiuchi et al. | |
| 9,395,292 B2 | 7/2016 | Wei et al. | |
| 9,689,803 B1* | 6/2017 | Ruttner | G06K 9/6202 |
| 10,038,884 B2* | 7/2018 | Holub | G01J 3/0264 |
| 2010/0274256 A1* | 10/2010 | Ritchey | A61B 34/20 |
| | | | 606/96 |
| 2013/0114118 A1 | 5/2013 | Zahorsky | |
| 2014/0017802 A1* | 1/2014 | Smith | G01N 31/22 |
| | | | 436/164 |
| 2014/0072189 A1* | 3/2014 | Jena | A61B 5/1455 |
| | | | 382/128 |
| 2014/0098243 A1* | 4/2014 | Ghazizadeh | G06K 19/06046 |
| | | | 348/187 |
| 2015/0015721 A1 | 1/2015 | Fan et al. | |
| 2015/0055134 A1* | 2/2015 | Papautsky | G01N 21/278 |
| | | | 356/408 |
| 2015/0359459 A1* | 12/2015 | Taylor | A61B 5/0077 |
| | | | 600/477 |
| 2017/0078496 A1* | 3/2017 | Sugimoto | H04N 1/00034 |
| 2017/0085852 A1* | 3/2017 | Holub | H04N 9/735 |
| 2017/0302915 A1 | 10/2017 | Kang et al. | |
| 2018/0013926 A1* | 1/2018 | Yamaguchi | H04N 1/00045 |
| 2018/0080829 A1* | 3/2018 | Tanimura | G01N 21/251 |
| 2018/0342224 A1* | 11/2018 | Beon | G09G 5/10 |
| 2019/0028614 A1* | 1/2019 | De Paepe | H04N 1/6008 |
| 2019/0163707 A1* | 5/2019 | Whigham | G06Q 10/06316 |

OTHER PUBLICATIONS

Color calibration of a CMOS digital camera for mobile imaging, Eliasson, Henrik, SPIE, 2010, pp. 1-12 (Year: 2010).*

Ilie ; Ensuring Color Consistency across Multiple Cameras ; Department of Computer Science, University of North Carolina at Chapel Hill ; Apr. 2004 ; 9 Pages.

Fezza, et al. ; Color Image and Video Enhancement ; pp. 295-296 ; 2015 ; 5 pages.

* cited by examiner

METHOD FOR CHROMATIC CALIBRATION OF AN EMBEDDED CAMERA OF A MOBILE WIRELESS DEVICE

BACKGROUND

Field of the Invention

The present disclosure relates chromatic calibration systems and methods for devices having an embedded camera including determining color calibration data from captured images.

Description of the Related Art

High quality of images captured by embedded cameras, such as those in modern smartphones, has not only become expected, but is a particularly salient selling point in the marketplace. However, the colors represented in image data captured by such embedded cameras are not always faithful to those of the scene or object from which the image data were acquired. This is due to, among other things, limited detector responsiveness to different colors and shortcomings in image processing software on some devices.

Chromatic calibration seeks to measure and adjust the color response of image capture and/or display devices so that colors are represented as close as possible to those of a known color space (e.g., RGB (red, green, blue) CMYK (cyan, magenta, yellow, black) etc.). To calibrate a camera, a known calibration target is photographed and the resulting output from the camera is converted to color values. A correction profile is then built using the difference between the camera result values and the known reference values. Typically, such calibration is performed on each device separately and efforts to relieve the time consuming process of individualized chromatic calibration are ongoing.

SUMMARY

An aspect of the invention includes a method of chromatic calibration of a device having an embedded camera that proceeds by illuminating a plurality of color references with at least one light source. Images of the respective illuminated color references are captured with the embedded camera. Color calibration data are determined from the captured images and the color calibration data are stored in association with an identifier of the device.

In an embodiment illuminating includes illuminating the color references with a white light source.

In an embodiment a white light source is a camera flash light on the embedded device.

In an embodiment a determining the color calibration data includes selecting a color model with which a color space is represented in the captured images; determining chromatic values in each of the color channels in the captured images; and subtracting the color channel chromatic value from an ideal chromatic value of the color channel.

In an embodiment the illuminating includes selecting a color of the light source to be of like color as one the color references; and selecting another color of the light source to be of like color as another one of the color references subsequent to capturing the images of the color references under illumination by the previously selected light source.

In an embodiment the determining includes selecting a color model with which a color space is represented in the captured images; determining chromatic values in each of the color channels; and subtracting the color channel chromatic value from an ideal chromatic value of the color channel.

In an embodiment the method may be performed on a device in an enclosure having an aperture formed therein through which the embedded camera is optically aligned and in which the color reference is installed to be optically aligned with the camera.

In another aspect the invention includes an apparatus for chromatic calibration of a an embedded camera that includes an enclosure having an aperture formed therein through which the embedded camera is optically aligned; a plurality of color references each being selectively installable within the enclosure; a processor configured to illuminate the color references with at least one light source; obtain images of the respective illuminated color references captured with the embedded camera; and determine color calibration data from the captured images; and a storage device to store the color calibration data in association with an identifier of the device.

In an embodiment the apparatus includes a processor configured to determine chromatic values in each of color channels in the captured images; and subtract the color channel chromatic value from an ideal chromatic value of the color channel.

In an embodiment the apparatus includes a processor configured to select a color of the light source to be of like color as one the color references; and select another color of the light source to be of like color as another one of the color references subsequent to capturing the images of the color references under illumination by the previously selected light source.

In another aspect the invention includes a computer-readable medium having encoded thereon processor instructions that, when executed by a processor, instructs the processor to illuminate a plurality of color references with at least one light source; obtain images of the respective illuminated color references captured with the embedded camera; determine color calibration data from the captured images; and store the color calibration data in association with an identifier of the device.

DETAILED DESCRIPTION

Figure 1:
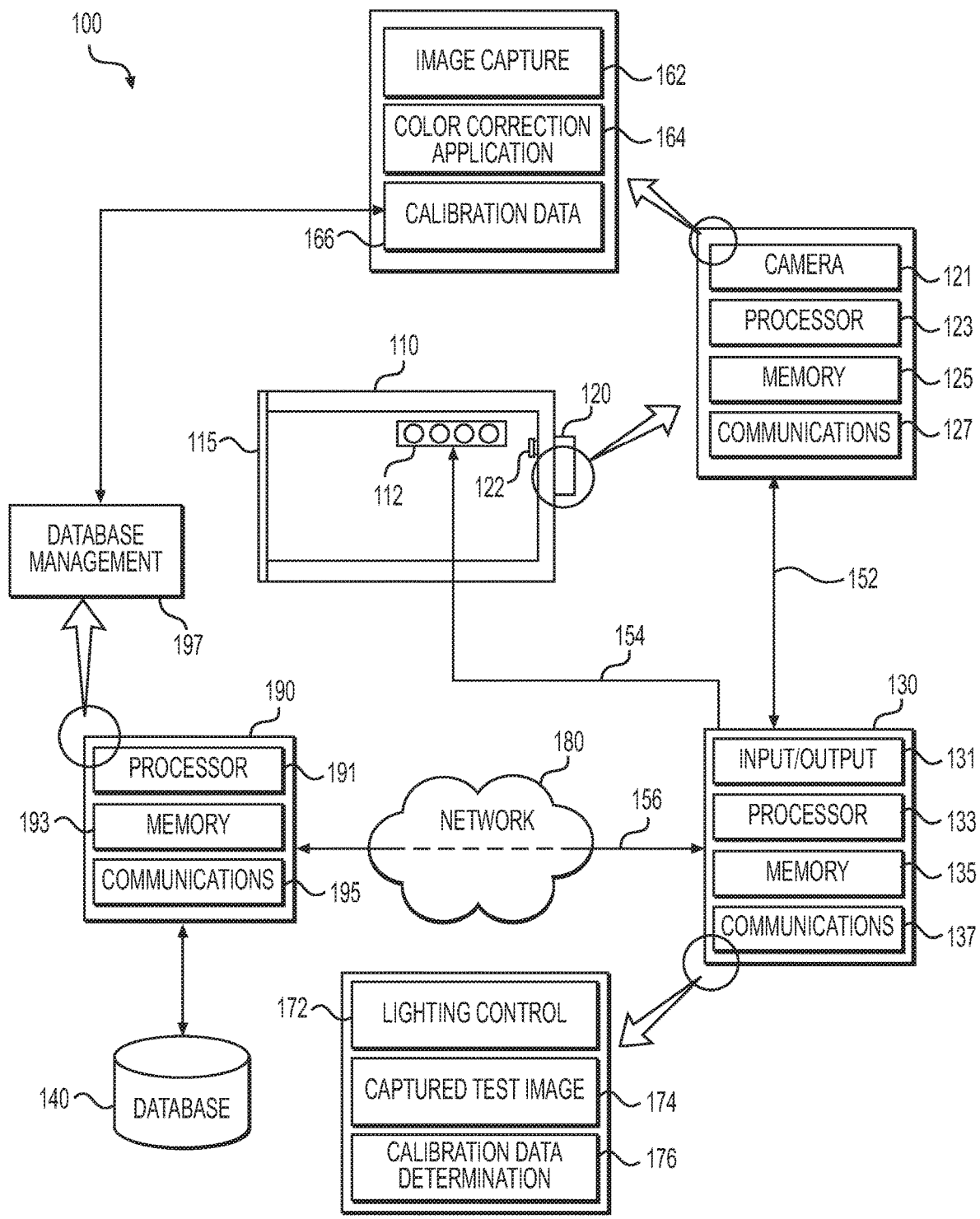
FIG. 1 is a schematic block diagram of an exemplary chromatic calibration system by which the present general inventive concept can be embodied.

The present invention may be described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The techniques described herein are preferably directed to chromatic calibration of embedded cameras, such as those found in smartphones. Upon review of this disclosure and appreciation of the concepts disclosed herein, the ordinarily skilled artisan will recognize other image capturing applications to which the present inventive concept can be applied. The scope of the present invention is intended to encompass all such alternative implementations.

FIG. 1 is a schematic block diagram of an exemplary chromatic calibration system 100 by which the present invention can be embodied. As illustrated in the figure, chromatic calibration system 100 may include a test enclosure 110, a device under test (DUT) 120, a computing device 130, a database 140 and a server device 190. Generally, raw color data are taken from DUT 120 under various lighting conditions and processed by computing device 130 to generate data by which DUT 120 is color calibrated. For purposes of explanation, the following descriptions adopt an RGB (red-blue-green) color model. It is to be understood that chromatic calibration using other color models may be achieved by embodiments of the invention without departing from the spirit and intended scope thereof.

Enclosure 110 may be constructed to prevent stray light, i.e., light from the outside enclosure 110, from entering its interior. In one embodiment, enclosure 110 is constructed of a black resin by 3D printing operations, although the present invention is not so limited. Enclosure 110 may have an aperture 111 on one side at which a colored reflector 115 may be mounted. Colored reflector 115 serves as a color reference having a specific target color. In certain embodiments, such reflector may be standardized or otherwise known to have a specific reflected light spectrum e.g., narrow spectral band about the desired color. Narrow spectral bands include for example red (590-750 nm, preferably 620-700 nm), yellow (495-590 nm preferably 570-590 nm); blue (380-495 nm, preferably 450-490 nm). Light sources 112 interior to enclosure 110 may illuminate reflector 115. Light sources 112 may also be standardized or otherwise known to have a specific reflected light spectrum. A lens 122 may be mounted to DUT 120 to focus its camera 121 on the illuminated reflector 115 and DUT 120 may capture an image of the illuminated reflector 115 through lens 122. The captured image may be analyzed by computing device 130 to determine calibration data, which may then be stored in database 140 in association with suitable identification information (DUT model, embedded camera model, etc.). Accordingly, any other smartphone or other device of the same model can utilize the calibration data without having to explicitly calibrate the device.

Figure 2A:
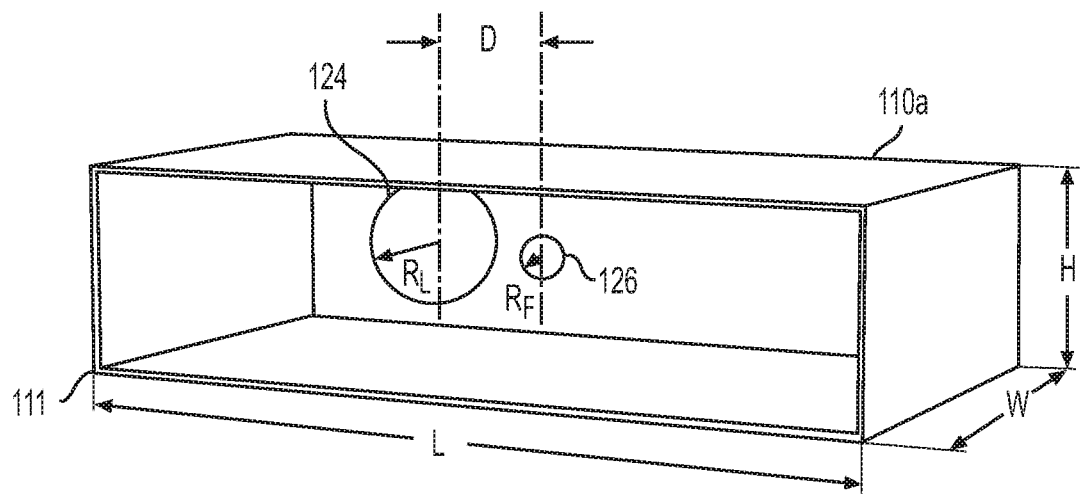
FIGS. 2A-2B are illustrations of an example enclosure that can be used in conjunction with embodiments of the present general inventive concept.

FIG. 2A is an illustration of an example embodiment of enclosure 110, designated enclosure 110a for purposes of distinction. Enclosure 110a may be of single piece construction having dimensions L×W×H and having aperture 111 formed on one side. On an opposing side, as illustrated in the figure, enclosure 110a may have formed thereon a camera aperture 124 and a flash aperture 126. Camera aperture 124 and flash aperture 126 are positioned relative to one another corresponding to the lens/flash configuration of the particular DUT 120. For example, camera aperture 124 may have a radius $R_L$ and may be spaced apart from flash aperture 126, which may have a radius $R_F$, by a distance D. Since each device model may have different lens/flash configurations, separate and distinct enclosures 110a may be constructed for each DUT 120, such as by 3D printing. Preferably L is 3-20×$R_L$, more preferably 5-10×$R_L$; W is 3-10×$R_L$, preferably 4-5×$R_L$; and H is 2-10×$R_L$, preferably 3-5×$R_L$.

In any preferable embodiment of the invention the camera aperture may be separated from the flash aperture by a distance of at least the radius $R_L$ or $R_F$. Is preferable that the flash aperture is separated from the camera aperture by a distance D that is no more than 2×$R_L$, preferably 1.5×$R_L$, more preferably $R_L$. In other embodiments the flash aperture has a radius $R_F$ that is smaller than the radius of the camera $R_L$. In preferable embodiments of the invention $R_F$ is 0.5, 0.6, 0.7, 0.8 or 0.9×$R_L$. In a still further embodiment of the invention the camera aperture and the flash aperture are mated under a single protective transparent cover such as glass, sapphire or ITO (indium tin oxide). In still further embodiments of the invention one or more of the flash aperture or camera aperture is biased to protrude from the surface of the enclosure. Preferably the flash aperture protrudes from the surface of the enclosure by 0.1, 0.2, 0.3, 0.4 or 0.5×$R_F$.

Figure 2B:
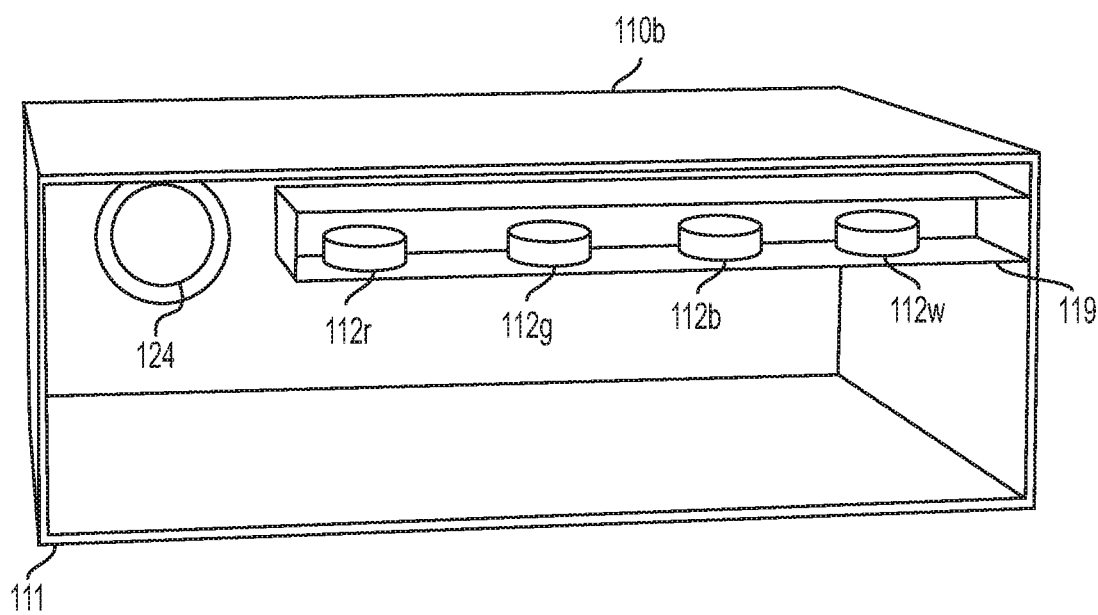

FIG. 2B is an illustration of another example embodiment of enclosure 110 designated enclosure 110b for purposes of distinction. Enclosure 110b may be of similar single piece construction as enclosure 110a, but may include a shelf 119 on which several light sources are mounted, e.g., a red light source 112r, a green light source 112g, a blue light source 112b and a white light source 112w. Light sources 112r, 112g, 112b may be light emitting diodes (LEDs) of sufficiently narrow band around the wavelength of the designated color, i.e., red, blue and green, and light source 112w may be a suitable broadband white LED. Light sources 112r, 112g, 112b and 112w may be mounted on shelf 119 so as to be directed towards aperture 111 to illuminate color reflector 115 when mounted thereon. Shelf 119 may be mounted a suitable distance from camera aperture 124 so as to be out of the camera field of view when lens 122 is mounted thereon. In a preferable embodiment the light sources are mounted flush to the wall of the enclosure. In still a further embodiment the light sources are mounted flush on the inside of the top of the enclosure.

Figure 3:
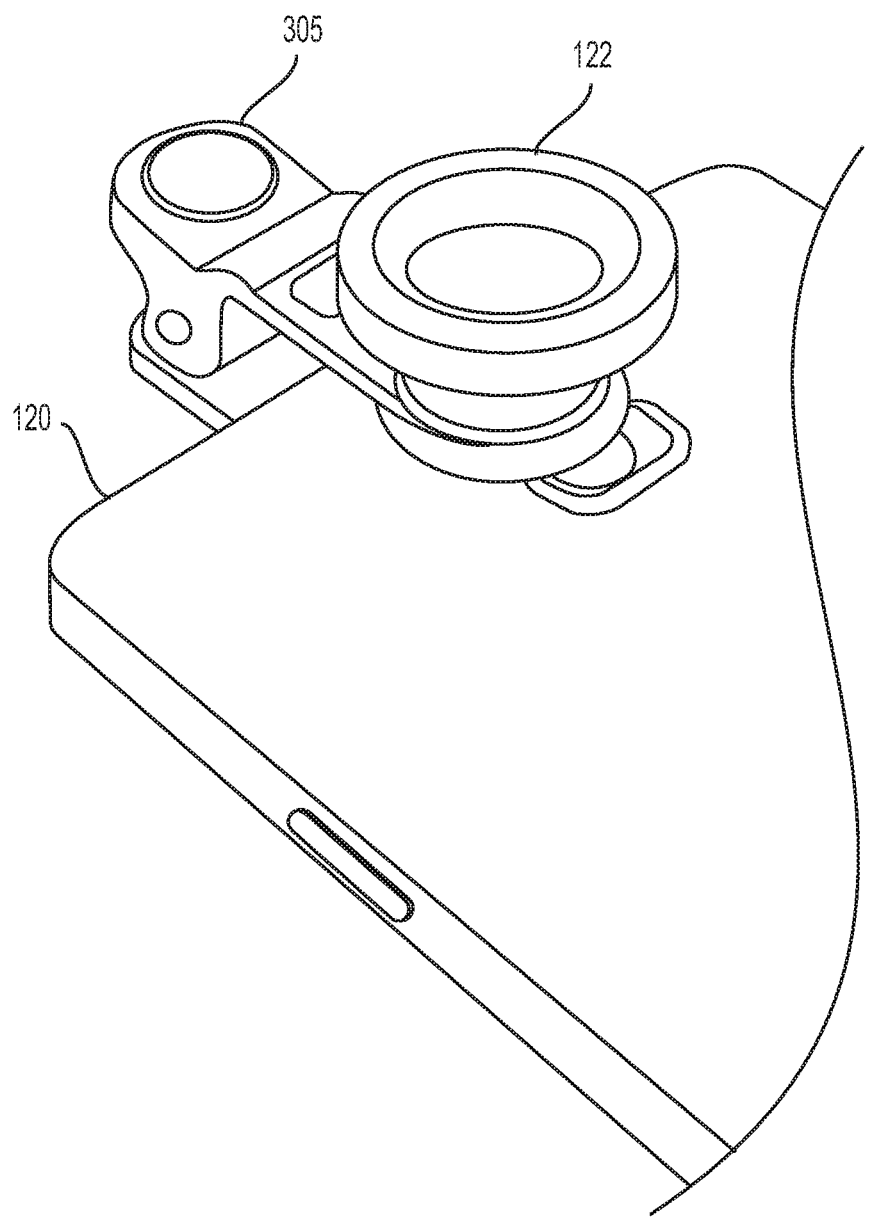
FIG. 3 is an illustration of a DUT with a lens attached in front of the camera lens that can be used in conjunction with the present general inventive concept.

FIG. 3 is an illustration of a DUT 120, in this case a smartphone, with lens 122 attached in front of the camera lens (not illustrated) of DUT 120. Such lenses are commercially available in various focal lengths and effective apertures and may be mounted by means of a clip 305 or other attachment device. In certain embodiments, clip 305 may be used to retain DUT 120 to enclosure 110 in addition to attaching lens 122 to DUT 120.

Returning now to FIG. 1, DUT 120 may include a camera 121, processor circuitry 123, memory circuitry 125 and communications circuitry 127. These resources may realize an image capture process 162, by which images are captured and a color correction application 164 through which color calibration data 166 stored in memory 125 are obtained from database 140, such as over network 180, and applied to images captured by image capture process 162. In one embodiment, color calibration data 166 comprise color calibration terms that are added or subtracted, depending on the arithmetic sign of the color calibration term, to pixel values of respective color channels for every image captured by the embedded camera.

Computing device 130 may include input/output (IO) circuitry 131, processor circuitry 133, memory circuitry 135 and communications circuitry 137. These resources may realize, among other things typical of a computing device, a lighting control process 172, by which colored light sources are selectively activated and calibration data determination process 176, by which calibration data 166 are determined from captured test image 174. Server device 190 may comprise processor circuitry 191, memory circuitry 193 and communications circuitry 195. These resources may realize, among other things typical of a server device, a database management process 178, by which calibration factors are stored and maintained in database 140.

As illustrated in FIG. 1, DUT 120 and computing device 130 may be communicatively coupled through a suitable communication link 152, such as over a universal serial bus (USB) connection or over a wireless connection such as BLUETOOTH or WiFi, and computing device 130 and server device 190 may be communicatively coupled through a suitable communication link 156, such as over the Internet. The present invention is not limited to particular media, signaling conventions or communications protocols underlying communication links 152 and 156. Those having skill in the art will recognize numerous techniques by which communication links 152 and 156 can be realized in embodiments of the invention.

In certain embodiments, computing device 130 may be communicatively coupled to light source 112 through a control link 154, such as over a USB connection. For example, control link 154 may carry a suitable signal under control of lighting control process 172 to select a particular light source 112 (e.g., red, green, blue or white) without having to open enclosure 110. In other embodiments, a set of switches (not illustrated) may be mounted on the exterior of enclosure 110 by which the colored light source can be selected.

In certain embodiments, enclosure 110 is constructed, such as by 3D printing, to correspond to dimensional specifications of DUT 120. DUT 120 may be attached to enclosure 110, such as by lens clip 305, and calibration data may be generated by calibration data determination process 176, as described below. Once the calibration data have been generated, they may be conveyed to and stored on database 140. Color correction application 164 executing on any device having the same embedded camera, such as the same model smartphone, may query database management process 197 for the calibration data, which it may then store in its memory 125 as calibration data 166. Color correction application 164 may then apply calibration data 166 to images acquired by camera 121, such as by addition/subtraction of color calibration terms to the respective color channels.

In the discussion that follows, a three letter notation is adopted to distinguish the data: the first letter identifies the light source color, the second letter identifies the reflector color and the third letter identifies a particular color channel. For example, WRB indicates a white light source is incidental upon a red reflector with the blue channel being measured. Subscript "c" refers to values provided by the camera and without subscript refers to ideal values, e.g., $WRR_c$ represents white light source, red reflector and red channel for the camera.

Figure 4:
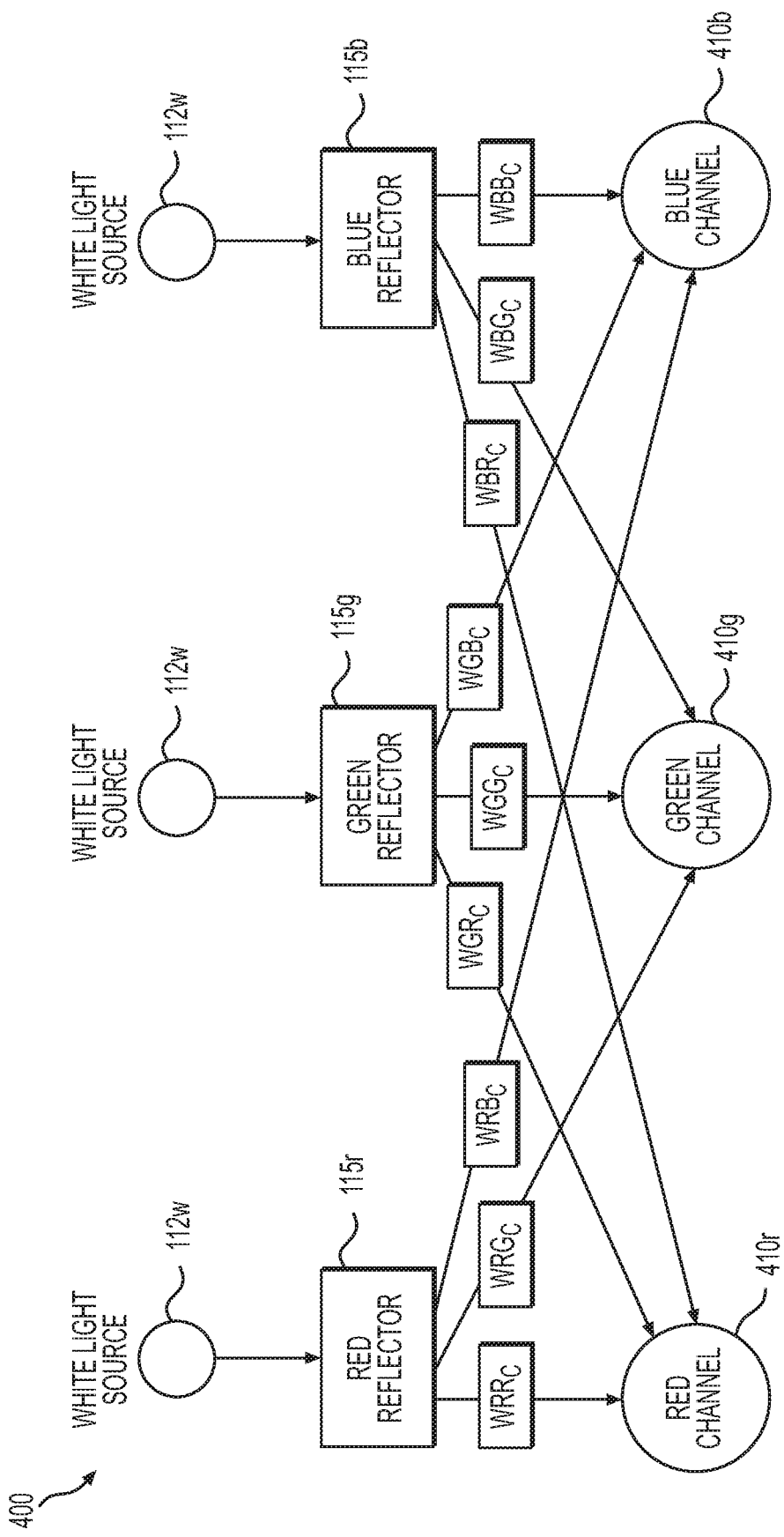
FIG. 4 is a graphical depiction of an example chromatic calibration process by which the present general inventive concept can be embodied.

FIG. 4 is a graphical depiction of an example chromatic calibration process 400 by which the present invention can be embodied. In process 400, each of three reflectors, red reflector 115r, green reflector 115g and blue reflector 115b are illuminated by a white light source 112w. Light source 112w may be realized by the camera flash or may be an LED mounted on shelf 119 illustrated in FIG. 2B. The reflected light is captured in an image, such as by image capture process 162, and each of red channel 410r, green channel 410g and blue channel 410b are consulted, such as through the RGB pixel values in the captured test image 174. The reflected light for each channel is indicated in the figure by the three letter notation described above.

When pure white light falls on red, green or blue reflectors, ideally the color contributions in the respective color channel (red, blue and green channels) should be maximum (e.g., red channel value for red reflector should be 255) and the contribution to other color channels should be zero (e.g., green and white channel value for red reflected light should be 0). However, due to suboptimal design and limitations of smartphone camera hardware and software, the value in the respective channel is not 255 and some contributions to other channels are observed (i.e., non-zero values). In certain embodiments, contributions to the respective channel are maximized and the contributions to other channels are minimized or removed. This can be achieved by finding the difference (Δ) between the ideal values and smartphone camera values for each channel. The difference Δ may then be used as a calibration term to correct for chromatic differences between different models and makers of smartphone cameras. These values may be determined according to Table 1 below by, for example, calibration data determining process 176.

TABLE 1

| Source LED | Reflector Color | Notation | Ideal Value | Camera Value | Difference, Δ | Ideal Δ | Empirical Δ |
|---|---|---|---|---|---|---|---|
| White | Red | WRR | 255 | $WRR_c$ | $\Delta WRR_c = WRR - WRR_c$ | $\Delta WRR_c = 0$ | $\Delta WRR_c \geq 0$ |
| | Green | WRG | 0 | $WRG_c$ | $\Delta WRG_c = WRG - WRG_c$ | $\Delta WRG_c = 0$ | $\Delta WRG_c \leq 0$ |
| | Blue | WRB | 0 | $WRB_c$ | $\Delta WRB_c = WRB - WRB_c$ | $\Delta WRB_c = 0$ | $\Delta WRB_c \leq 0$ |
| White | Red | WGR | 0 | $WGR_c$ | $\Delta WGR_c = WGR - WGR_c$ | $\Delta WGR_c = 0$ | $\Delta WGR_c \leq 0$ |
| | Green | WGG | 255 | $WGG_c$ | $\Delta WGG_c = WGG - WGG_c$ | $\Delta WGG_c = 0$ | $\Delta WGG_c \geq 0$ |
| | Blue | WGB | 0 | $WGB_c$ | $\Delta WGB_c = WGB - WGB_c$ | $\Delta WGB_c = 0$ | $\Delta WGB_c \leq 0$ |
| White | Red | WBR | 0 | $WBR_c$ | $\Delta WBR_c = WBR - WBR_c$ | $\Delta WBR_c = 0$ | $\Delta WBR_c \leq 0$ |
| | Green | WBG | 0 | $WBG_c$ | $\Delta WBG_c = WBG - WBG_c$ | $\Delta WBG_c = 0$ | $\Delta WBG_c \leq 0$ |
| | Blue | WBB | 255 | $WBB_c$ | $\Delta WBB_c = WBB - WBB_c$ | $\Delta WBB_c = 0$ | $\Delta WBB_c \geq 0$ |

The difference values Δ may be stored in database 140 in association with the smartphone and/or camera model number or other distinguishing identifier. A user of any like smartphone may recover the Δ values as calibration data 166 through, for example, color correction application 164. Color correction application 164 may apply color correction data 166 to obtain final values (as indicated by the subscript "f") for each reflected light configuration according to Table 2 below.

TABLE 2

| Red Channel | Green Channel | Blue Channel |
|---|---|---|
| $WRR_f = WRR_c + \Delta WRR_c$ | $WRG_f = WRG_c + \Delta WRG_c$ | $WRB_f = WRB_c + \Delta WRB_c$ |
| $WGR_f = WGR_c + \Delta WGR_c$ | $WGG_f = WGG_c + \Delta WGG_c$ | $WGB_f = WGB_c + \Delta WGB_c$ |
| $WBR_f = WBR_c + \Delta WBR_c$ | $WBG_f = WBG_c + \Delta WBG_c$ | $WBB_f = WBB_c + \Delta WBB_c$ |

By combining the effects of all three color reflectors, the final calibrated value for each channel may be given by $WR_f=(WRR_c+\Delta WRR_c)+(WMR_c+\Delta WGR_c)+(WBR_c+\Delta WBR_c)$ for the red channel, $WR_f=(WRR_c+\Delta WRR_c)+(WMR_c+\Delta WGR_c)+(WBR_c+\Delta WBR_c)$ for the green channel and $WB_f=(WRB_c \Delta WRB_c)+(WGB_c+\Delta WGB_c)+(WBB_c+\Delta WBB_c)$ for the blue channel. The color calibration term may be added to/subtracted from the corresponding channel for any arbitrary image. After the operation, the maximum and minimum values may be restricted to 255 and 0, respectively.

Figure 5:
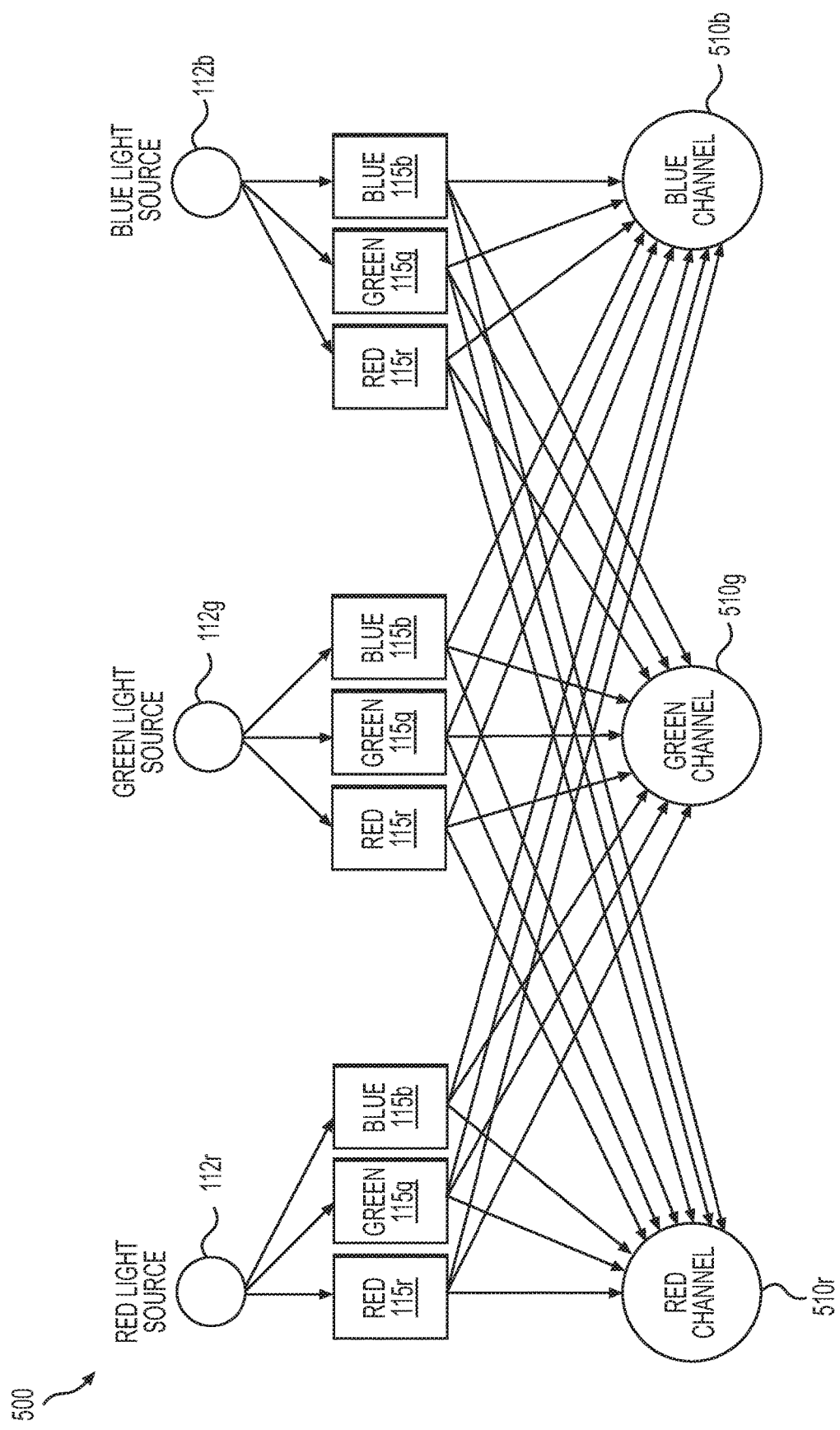
FIG. 5 is a graphical depiction of another example chromatic calibration process by which the present general inventive concept can be embodied.

FIG. 5 is a graphical depiction of another example chromatic calibration process 500 by which the present invention can be embodied. In process 500, each of three reflectors, red reflector 115r, green reflector 115g and blue reflector 115b are illuminated by respective light sources: red light source 112r, green light source 112g and blue light source 112b. With similarity to process 400, the difference values Δ for process 500 may be determined according to Table 3 below by, for example, calibration data determining process 176. In Table 3, designators with only two (2) letters in the notation refer collectively to all three channels being operated on the same. Additionally, the three letter notation on the reflected light for each channel, as was indicated in FIG. 4, has been omitted to avoid overly congesting the figure.

operation 610, a light source 112 of a first color is selected, either by activating the camera flash or by selecting an LED on shelf 119 in enclosure 110. In operation 615, a test image is captured using the current reflector and light source colors and, in operation 620, the response in each channel is determined, such as by evaluating the RGB pixel values in the captured test image. In operation 625, it is determined whether all light sources have been evaluated and, if not, process 600 transitions to operation 610 and executes from that point. If all light sources have been evaluated, as determined in operation 625, process 600 may transition to operation 630, by which it is determined whether all reflector colors have been evaluated. If not, process 600 may transition to operation 605 and continue from that point. Otherwise, process 600 may transition to operation 635 by which the difference values are determined, such as by the techniques described above. In operation 640, the difference values may be stored in database 140 in association with an identifier of the device under test and/or the camera embedded in the device under test. The difference values may subsequently be retrieved by a device having the same identifier(s), such as by color correction application 164.

The storage areas and memory described herein may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. The storage areas may be, for example, one or more databases implemented on a solid state drive or in a RAM cloud.

Processor circuitry described herein is, for example, one or more data processing devices such as microprocessors, microcontrollers, systems on a chip (SOCs), or other fixed or programmable logic, that executes instructions for process

TABLE 3

| Source LED | Reflector Color | Notation | Ideal Value | Camera Value | Difference, Δ | Ideal Δ | Empirical Δ |
|---|---|---|---|---|---|---|---|
| Red | Red | RRR | 255 | $RRR_c$ | $\Delta RRR_c = RRR - RRR$ | $\Delta RR_c = 0$ | $\Delta RR_c \geq 0$ |
| | | RRG, RRB | 0 | | | | |
| | Green | RGR, RGG, RGB (RG) | 0 | $RG_c$ | $\Delta RG_c = RG - RG_c$ | $\Delta RG_c = 0$ | $\Delta RG_c \leq 0$ |
| | Blue | RBR, RBG, RBB (RB) | 0 | $RB_c$ | $\Delta RB_c = RB - RB_c$ | $\Delta RB_c = 0$ | $\Delta RB_c \leq 0$ |
| Green | Red | GRR, GRG, GRB (GR) | 0 | $GR_c$ | $\Delta GR_c = GR - GR_c$ | $\Delta GR_c = 0$ | $\Delta GR_c \leq 0$ |
| | Green | GGG | 255 | $GGG_c$ | $\Delta GGG_c = GGG - GGG$ | $\Delta GG_c = 0$ | $\Delta GG_c \geq 0$ |
| | | GGR, GGB | 0 | | | | |
| | Blue | GBR, GBG, GBB (GB) | 0 | $GB_c$ | $\Delta GB_c = GB - GB_c$ | $\Delta GB_c = 0$ | $\Delta GB_c \leq 0$ |
| Blue | Red | BRR, BRG, BRB (BR) | 0 | $BR_c$ | $\Delta BR_c = BR - BR_c$ | $\Delta BR_c = 0$ | $\Delta BR_c \leq 0$ |
| | Green | BGR, BGG, BGB (BG) | 0 | $BG_c$ | $\Delta BG_c = BG - BG_c$ | $\Delta BG_c = 0$ | $\Delta BG_c \leq 0$ |
| | Blue | BBB | 255 | $BBB_c$ | $\Delta BBB_c = BBB - BBB$ | $\Delta BB_c = 0$ | $\Delta BB_c \geq 0$ |
| | | BBR, BBG | 0 | | | | |

Figure 6:
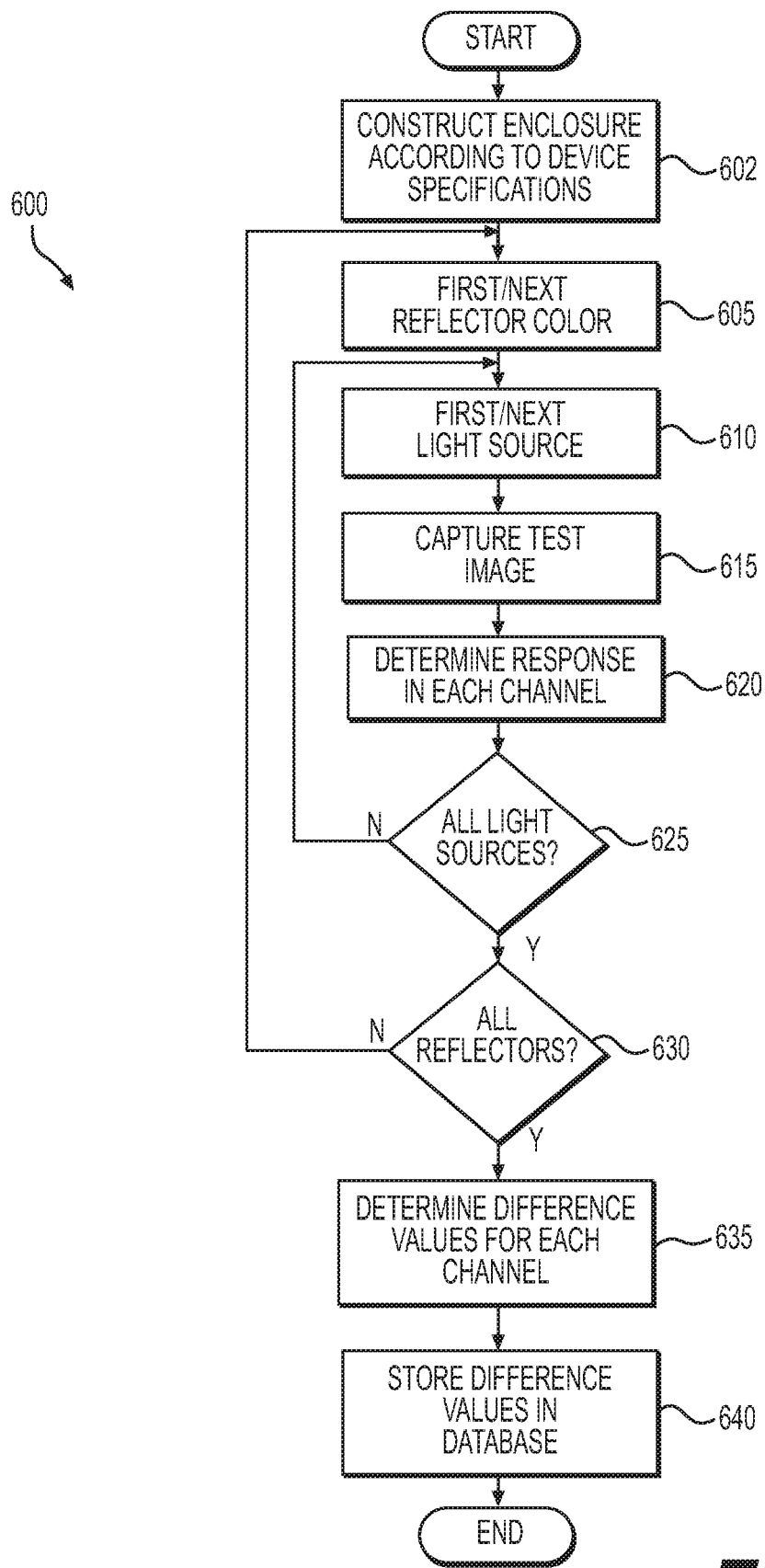
FIG. 6 is a flow diagram of an example chromatic calibration process by which the present general inventive concept can be embodied.

FIG. 6 is a flow diagram of an exemplary chromatic calibration process 600 by which the present invention can be embodied. In operation 602, an enclosure is constructed, such as by 3D printing, according to the specifications of DUT 120, e.g. the distance between the camera aperture and flash LED. In operation 605, a reflector 115 of a first color is selected and attached to aperture 111 of enclosure 110. In logic stored in memory. The processors may themselves be multi-processors, and have multiple CPUs, multiple cores, multiple dies comprising multiple processors, etc.

Communicative coupling described herein may be, for example, via a networks, which represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the system may include any conventional or other communications devices to communicate over the networks via any conventional or other protocols, and may utilize any type of connection (e.g., wired, wireless, etc.) for access to the network.

System 100 includes a communications circuitry 127, 137, and 195 (e.g., network controller), such as an Intel Ethernet PRO network interface card from Intel Corporation of America, for interfacing on communication links 152 and 156. As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known.

System 100 may include additional servers, clients, and other devices not shown, and individual components of the system may occur either singly or in multiples, or for example, the functionality of various components may be combined into a single device or split among multiple devices. It is understood that any of the various components of system 100 may be local to one another, or may be remote from and in communication with one or more other components via any suitable means, for example a network such as a WAN, a LAN, Internet, Intranet, mobile wireless, etc.

Color correction application 164 provides an interface such as a graphical user interface (GUI) for a user of the client device (smartphone) to interact with a server. The application may be a database client, etc.

In addition to functionality described above, I/O interface 131 may enable communication between a display device, input device(s), and output device(s), and other components of computing device 130, and may enable communication with these devices in any suitable fashion, e.g., via a wired or wireless connection. The display device may be any suitable display, screen or monitor capable of displaying information to a user of computing device 130, for example the screen of a tablet or the monitor attached to a computer workstation. Input device(s) may include any suitable input device, for example, a keyboard, mouse, trackpad, touch input tablet, touch screen, camera, microphone, remote control, speech synthesizer, or the like. Output device(s) may include any suitable output device, for example, a speaker, headphone, sound output port, or the like. The display device, input device(s) and output device(s) may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

As will be appreciated by one skilled in the art, aspects of the present invention may be embodied as a system, method or computer program product. Aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It is to be understood that the software used in embodiments of the present invention may be implemented in any desired computer language and could be developed by one of ordinary skill in the computer arts based on the functional descriptions contained herein. By way of example only, the software may be implemented in the C, C++, C #, Java, Python, Fortran or other programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A method of chromatic calibration of a mobile wireless communications device having an embedded camera, wherein the mobile wireless communications device further comprises a first flat main surface, a second flat main surface, a lens, a light source, processor circuitry, memory circuitry, and communications circuitry, wherein the lens and light source are on the first flat main surface of the mobile wireless communications device and the first flat main surface is opposite the second flat main surface, and wherein the light source is proximal to the lens, the method comprising:

placing the first flat main surface of the mobile wireless communications device flush against a first wall of an enclosure, wherein the first wall of the enclosure has a lens aperture and a light aperture, wherein lens aperture is separated from the light aperture by a distance of at least the radius of the lens aperture, and the first flat main surface is positioned flat against the first wall so that the lens is optically aligned with the lens aperture and the light source is aligned with the light aperture, wherein the enclosure has a second wall opposite and parallel to the first wall, wherein the second wall has a colored reflector surface corresponding with an inside surface of the enclosure, wherein the colored reflector surface is configured to mount a color reference surface providing a reflected light spectrum, wherein the enclosure has further walls to prevent light from entering inside the enclosure, sequentially illuminating a plurality of color reference surfaces independently mounted inside the enclosure on the colored reflector surface, each color reference surface of the plurality of color reference surfaces having a unique reflected light spectrum with the light source of the mobile wireless communications device;

capturing an image of each color reference surface of the plurality of color reference surfaces with the embedded camera of the mobile wireless communications device to provide a plurality of color reference captured images, and storing the plurality of color reference captured images in the memory circuitry of the mobile wireless communications device;

determining color calibration data from the plurality of color reference captured images by:

selecting a color model with which a color space is represented for each image of the plurality of color reference captured images, wherein the color model comprises a plurality of color channels of the color space;

determining, for each image of the plurality of color reference captured images, measured chromatic values for each of the plurality of color channels;

obtaining, from a remote database of ideal chromatic values, over a wireless communications network, ideal chromatic values for each of the plurality of color channels, determining, using the processing circuitry of the mobile wireless communications device, a difference value between the ideal chromatic values and the measured chromatic values for each image of the plurality of color reference captured images, and applying a color correction corresponding to a difference value to each of the measured chromatic values for each color channel of the measured chromatic values for each image of the plurality of color reference captured images to thereby obtain a chromatic calibration of the mobile wireless communications device; and storing the difference values for each color channel as the color calibration data In association with an identifier of the mobile wireless communications device in the memory circuitry of the mobile wireless communications device.

2. The method of claim 1, wherein the illuminating of the plurality of color references comprises illuminating the plurality of color references with a white light source.

3. The method of claim 1, wherein the illuminating of the plurality of color references comprises:

selecting a first color of the light source to be of like color as a first color reference of the plurality of color references; and selecting a second color of the light source to be of like color as a second color reference of the plurality of color reference surfaces subsequent to capturing the images of the color references under illumination by the first color of the light source.

4. The method of claim 1, wherein the identifier of the mobile wireless communications device is a model number thereof.

5. A method of chromatic calibration of a mobile wireless communications device having an embedded camera, wherein the mobile wireless communications device further comprises a first flat main surface, a second flat main surface, a lens, processor circuitry, memory circuitry, and communications circuitry, wherein the lens is on the first flat main surface of the mobile wireless communications device and the first flat main surface is opposite the second flat main surface, the method comprising:

placing the first flat main surface of the mobile wireless communications device flush against a first wall of an enclosure, wherein the first wall of the enclosure has a single lens aperture, wherein the first flat main surface is positioned so that the lens is optically aligned with the lens aperture and a second wall of the enclosure, wherein the second wall is opposite and parallel to the first wall, wherein the second wall has a colored reflector surface corresponding with an inside surface of the enclosure, wherein the colored reflector surface is configured to mount a color reference surface providing a reflected light spectrum, wherein the enclosure has further walls to prevent light from entering inside the enclosure, wherein the enclosure has a top wall mounted perpendicularly to the first and second walls, wherein the top wall comprises a plurality of light sources mounted flush to the top wall, a first light source of the plurality of light sources emitting a red wavelength band, a second light source of the plurality of light sources emitting a blue wavelength band and a third light source of the plurality of light sources emitting a green wavelength band;

sequentially illuminating a plurality of color reference surfaces independently mounted inside the enclosure on the colored reflector surface each color reference surface of the plurality of color reference surfaces having a unique reflected light spectrum with each of the light sources mounted on the top wall in the enclosure;

capturing an image of each color reference surface of the plurality of color reference surfaces with the embedded camera of the mobile wireless communications device to provide a plurality of color reference captured images, and storing the plurality of color reference captured images in the memory circuitry of the mobile wireless communications device;

determining color calibration data from the plurality of color reference captured images by:

selecting a color model with which a color space is represented for each image of the plurality of color reference captured images, wherein, the color model comprises a plurality of color channels of the color space;

determining, for each image of the plurality of color reference captured images, measured chromatic values for each of the plurality of color channels;

obtaining, from a remote database of ideal chromatic values, over a wireless communications network, ideal chromatic values for each of the plurality of color channels, determining, using the processing circuitry of the mobile wireless communications device, a difference value between the ideal chromatic values and the measured chromatic values for each image of the plurality of color reference captured images, and applying a color correction corresponding to the difference value to each of the measured chromatic values for each color channel of the measured chromatic value for each image of the plurality of color reference captured images to thereby obtain a chromatic calibration of the mobile wireless communications device; and storing the difference values for each color channel as the color calibration data in association with an identifier of the mobile wireless communications device in the memory circuitry of the mobile wireless communications device.

* * * * *